(12) United States Patent
Nien et al.

(10) Patent No.: US 12,557,195 B2
(45) Date of Patent: Feb. 17, 2026

(54) ELECTRONIC DEVICE

(71) Applicant: CARUX TECHNOLOGY PTE. LTD., Singapore (SG)

(72) Inventors: Chueh-Yuan Nien, Tainan (TW); Li-Wei Sung, Tainan (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 190 days.

(21) Appl. No.: 18/479,821

(22) Filed: Oct. 2, 2023

(65) Prior Publication Data
US 2024/0163997 A1 May 16, 2024

(30) Foreign Application Priority Data
Nov. 9, 2022 (CN) .......................... 202211400201.1

(51) Int. Cl.
*H05B 45/30* (2020.01)
*H05B 45/56* (2020.01)

(52) U.S. Cl.
CPC ............. *H05B 45/56* (2020.01); *H05B 45/30* (2020.01)

(58) Field of Classification Search
CPC ........ H05B 45/10; H05B 45/14; H05B 45/18; H05B 45/20; H05B 45/24; H05B 45/28; H05B 45/30; H05B 45/50; H05B 45/56; H05B 47/10; H05B 47/105; H05B 47/11; H05B 47/14
See application file for complete search history.

(56) References Cited

U.S. PATENT DOCUMENTS

| 2015/0115840 A1* | 4/2015 | Park | H05B 45/46 |
| | | | 315/307 |
| 2023/0090191 A1* | 3/2023 | Suyama | H05B 45/38 |
| | | | 315/307 |

FOREIGN PATENT DOCUMENTS

CN 101587697 11/2009

* cited by examiner

*Primary Examiner* — Long Nguyen
(74) *Attorney, Agent, or Firm* — JCIPRNET

(57) ABSTRACT

Disclosed is an electronic device, including a plurality of light-emitting units, a driving circuit, and a first comparator. The driving circuit is electrically connected to the light-emitting units. The first comparator is electrically connected to the driving circuit. The first comparator receives one of a detected power consumption value and a detected current value from the light-emitting units. The first comparator compares the one of the detected power consumption value and the detected current value with a set value and obtains a relationship therebetween to transmit a first signal. The driving circuit drives the light-emitting units according to the first signal.

18 Claims, 8 Drawing Sheets

ELECTRONIC DEVICE

CROSS-REFERENCE TO RELATED APPLICATION

This application claims the priority benefit of Chinese application no. 202211400201.1, filed on Nov. 9, 2022. The entirety of the above-mentioned patent application is hereby incorporated by reference herein and made a part of this specification.

BACKGROUND

Technical Field

The disclosure relates to an electronic device. Particularly, the disclosure relates to an electronic device including a light-emitting unit.

Description of Related Art

Under operating conditions of a high power consumption and/or a high temperature, reliability of light-emitting units in an electronic device may be at risk of occurrences of abnormality. Accordingly, a driving mode to reduce abnormality in reliability of the light-emitting unit under operating conditions of a high power consumption and/or a high temperature is one of the research focuses for those skilled in the related art.

SUMMARY

According to an embodiment of the disclosure, an electronic device includes a plurality of light-emitting units, a driving circuit, and a first comparator. The driving circuit is electrically connected to the light-emitting units. The first comparator is electrically connected to the driving circuit. The first comparator receives one of a detected power consumption value and a detected current value from the light-emitting units, and compares the one of the detected power consumption value and the detected current value with a set value and obtains a relationship therebetween to transmit a first signal. The driving circuit drives the light-emitting units according to the first signal.

According to an embodiment of the disclosure, an electronic device includes a panel, a driving circuit, and at least one temperature comparator. The panel includes a plurality of light-emitting units. The driving circuit is electrically connected to the light-emitting units. The at least one temperature comparator receives a detected temperature value from the light-emitting units and is configured to compare the detected temperature value with at least one received set temperature value and obtain a relationship therebetween to transmit a first signal. The driving circuit drives the light-emitting units according to the first signal.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
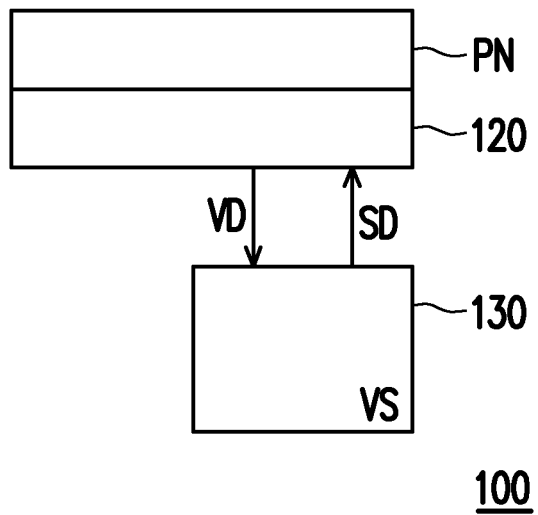
FIG. 1 is a schematic diagram of an electronic device according to a first embodiment of the disclosure.

The disclosure may be understood by referring to the following detailed description with the drawings. Note that for clarity of description and ease of understanding, the drawings of the disclosure show a part of an electronic device, and certain components in the drawings may not be drawn to scale. In addition, the number and size of each device shown in the drawings are only exemplary and not intended to limit the scope of the disclosure.

Certain terms are used throughout the description and the appended claims to refer to specific components. As is to be understood by those skilled in the art, electronic equipment manufacturers may refer to an component by different names. Herein, it is not intended to distinguish between components that have different names instead of different functions. In the following description and claims, terms such as "include", "comprise", and "have" are used in an open-ended manner, and thus should be interpreted as "including, but not limited to". Therefore, the terms "include", "comprise", and/or "have" used in the description of the disclosure denote the presence of corresponding features, regions, steps, operations, and/or components but are not limited to the presence of one or more corresponding features, regions, steps, operations, and/or components. The directional terms mentioned herein, like "above", "below", "front", "back', "left", "right", and the like, refer only to the directions in the accompanying drawings. Therefore, the directional terms are used for describing instead of limiting the disclosure. The accompanying drawings show general features of methods, structures, and/or materials used in specific embodiments. However, the drawings should not be interpreted as defining or limiting the scopes or properties covered by these embodiments. For example, relative sizes, thicknesses, and positions of film layers, regions, and/or structures may be reduced or enlarged for clarity. In the disclosure, description that a structure (or layer, component, or substrate) is located on/above another structure (or layer, a component, or a substrate) may refer to the case that the two structures are adjacent and directly connected, or the two structures are adjacent and non-directly connected. Non-direct connection refers to the case that at least one intermediary structure (or intermediary layer, intermediary component, or intermediary substrate, intermediary spacing) is present between two structures, where a lower side surface of one structure is adjacent to or directly connected to an upper side surface of the intermediary structure, and an upper side surface of the other structure is adjacent to or directly connected to a lower side surface of the intermediary structure. The intermediary structure may be composed of a single-layer or multi-layer physical structure or non-physical structure with no limitation. In the disclosure, when a structure is disposed "on" another structure, it may refer to the case that the structure is "directly" on the another structure, or the structure is "indirectly" on the another structure, namely at least one structure is further sandwiched between the structure and the another structure.

The terms "about", "equal", "equivalent", "same", "substantially", or "essentially" are generally so interpreted that a value is within 20% of a given value or range, or within 10%, 5%, 3%, 2%, 1%, or 0.5% of a given value or range.

Moreover, certain errors may exist between any two values or directions for comparison. If a first value is equal to a second value, it implies that an error of about 10% may exist between the first value and the second value. If a first direction is perpendicular or "essentially" perpendicular to a second direction, the angle between the first direction and the second direction may be between 80 degrees and 100 degrees. If a first direction is parallel or "essentially" parallel to a second direction, the angle between the first direction and the second direction may be between 0 degree and 10 degrees.

It should be understood that, according to the embodiments of the disclosure, a depth, a thickness, a width, or a height of each component or a spacing or a distance between components may be measured using an optical microscope (OM), a scanning electron microscope (SEM), a thin film thickness profiler ($\alpha$-step), an ellipsometer, or in other suitable manners. According to some embodiments, a cross-sectional structural image including a component to be measured may be obtained, and a depth, a thickness, a width, or a height of each component or a spacing or a distance between measured may be measured using a SEM.

Note that features in different embodiments described below may be replaced, recombined, or mixed to form another embodiment without departing from the spirit of the disclosure. The features in the embodiments may be arbitrarily used in mixture or combination without departing from the spirit of the disclosure or conflicting with each other.

Unless otherwise defined, all terms (including technical and scientific terms) used herein have the same meaning as commonly understood by one of ordinary skill in the art related to the disclosure. It will be understandable that terms, such as those defined in commonly used dictionaries, should be interpreted to have a meaning that is consistent with their meaning in the related art or the context of the disclosure and should not be interpreted in an idealized or overly formal sense unless particularly so defined in the embodiments of the disclosure.

In addition, terms such as "adjacent" in the description and claims are used to describe mutual proximity, and do not necessarily indicate mutual contact.

It should be understood that when a component is referred to as being "coupled to", "connected to", or "conducted to" another component, the component may be directly connected to the another component with electrical connection established, or intermediary components may be present between these components for electrical interconnection (indirect electrical connection). Comparatively, when a component is referred to as being "directly coupled to", "directly conducted to", or "directly connected to" another component, no intermediary components are present in between.

Although terms such as first, second, and third may be used to describe different constituent components, such constituent components are not limited by the terms. The terms are used only to discriminate one constituent component from other constituent components in the description. In the claims, the terms first, second, third, and so on may be used in accordance with the order of claiming components instead of using the same terms. Accordingly, a first constituent component in the following description may be a second constituent component in the claims.

The electronic device of the disclosure may include, but is not limited to, a head up display (HUD), display equipment, an antenna device, a sensing device, a light-emitting device, a touch display, a curved display, or a free-shape display. The electronic device may include a bendable or flexible electronic device. The electronic device may include, for example but not limited to, liquid crystals, light-emitting diodes, quantum dots (QD), fluorescence, phosphor, other suitable display media, or a combination thereof. The light-emitting diode may include, for example but not limited to, an organic light-emitting diode (OLED), a mini LED, a micro LED, or a quantum dot LED (including QLED and QDLED), other suitable materials, or a combination thereof. The display equipment may include tiled display equipment, for example but not limited thereto. The antenna device may be a liquid crystal antenna, for example but not limited thereto. The antenna device may include a tiled antenna device, for example but not limited thereto. Note that the electronic device may be any arrangement or combination of the above, but not limited thereto. In addition, the shape of the electronic device may be a rectangle, a circle, a polygon, a shape with a curved edge, or other suitable shapes. The electronic device may have a peripheral system, for example, a driving system, a control system, or a light source system, to support the display equipment, the antenna device, or the tiled device, but the disclosure is not limited thereto. The sensing device may include a camera, an infrared sensor, or a fingerprint sensor, and the disclosure is not limited thereto. In some embodiments, the sensing device may also include a flash, an infrared (IF) light source, other sensors, electronic components, or a combination thereof, but not limited thereto.

In the embodiments of the disclosure, the term "pixel" or "pixel unit" is used as a unit for describing a specific region including at least one functional circuit for at least one specific function. A region of a "pixel" is determined depending on a unit for providing a specific function. Adjacent pixels may share the same part or wire, but may also include its own specific parts therein. For example, adjacent pixels may share the same scan line or the same data line, but the pixels may also have their own transistors or capacitors.

The technical features in different embodiments described below may be replaced, recombined, or mixed to form another embodiment without departing from the spirit of the disclosure.

With reference to FIG. 1, FIG. 1 is a schematic diagram of an electronic device according to a first embodiment of the disclosure. In this embodiment, an electronic device 100 includes a panel PN, a backlight module 120, and a control circuit 130, but not limited thereto. In this case, the panel PN includes a non-self-luminous panel, for example, a liquid crystal panel or other suitable panels, but not limited thereto. The backlight module 120 includes a module formed by a plurality of light-emitting units. The backlight module 120 is configured to provide a light source to the panel PN.

In other embodiments, it is possible that the electronic device 100 does not include the backlight module 120, but the electronic device 100 may include the panel PN and the control circuit 130 (including at least one comparator), and the panel PN includes a plurality of light-emitting units. In this case, the panel PN includes a self-luminous panel, for example, a light-emitting diode (LED) panel, a quantum dot (QD) light-emitting diode panel, or other suitable panels, but not limited thereto. The light-emitting units are each an LED, for example. The LED may include an organic LED diode (OLED), an inorganic LED, a mini LED, a micro LED, a QD light-emitting diode (e.g., QLED or QDLED), other suitable materials, or any arrangement or combination thereof, for example but not limited thereto. In some embodiments, the control circuit 130 (including at least one comparator) provides a driving signal SD to the panel PN according to a comparison result between a detected value VD and a set value VS. In some embodiments, the control circuit 130 (including at least one comparator) may be electrically connected to one of the panel PN and/or the backlight module 120, for example. The control circuit 130 (including at least one comparator and a driving circuit) may be electrically connected to a plurality of light-emitting units in the panel PN and/or the backlight module 120, for example.

In some embodiments, when the control circuit 130 is electrically connected to the backlight module 120, the control circuit 130 (e.g., the comparator) may be configured to compare the detected value VD with the set value VS and obtain a relationship therebetween, for example. The control circuit 130 (e.g., the driving circuit) may provide the driving signal SD to drive the backlight module 120 (e.g., the light-emitting units in the backlight module 120) according to the comparison result between the detected value VD and the set value VS, but the disclosure is not limited thereto. In some embodiments, when the control circuit 130 is electrically connected to the panel PN, the control circuit 130 (e.g., the comparator) may be configured to compare the detected value VD with the set value VS and obtain the relationship therebetween, for example. The control circuit 130 (e.g., the driving circuit) may provide the driving signal SD to drive the panel PN (e.g., the light-emitting units in the panel PN) according to the comparison result between the detected value VD and the set value VS, but the disclosure is not limited thereto.

In some embodiments, the detected value VD may include at least one of a detected power consumption value, a detected current value, and a detected temperature value, for example but the disclosure is not limited thereto. The control circuit 130 may, for example, provide different driving signals according to operating conditions, such as different power consumptions (or currents) and/or different temperatures.

In some embodiments, when the control circuit 130 is electrically connected to the backlight module 120, the detected value VD may be at least one of the detected power consumption value, the detected current value, and the detected temperature value from the backlight module 120. In other words, the control circuit 130 (e.g., the comparator) may receive at least one of the detected power consumption value, the detected current value, and the detected temperature value from the light-emitting units in the backlight module 120. In some embodiments, when the control circuit 130 is electrically connected to the panel PN, the detected value VD may be at least one of the detected power consumption value, the detected current value, and the detected temperature value from the panel PN. In other words, the control circuit 130 (e.g., the comparator) may receive at least one of the detected power consumption value, the detected current value, and the detected temperature value from the light-emitting units in the panel PN.

Figure 2:
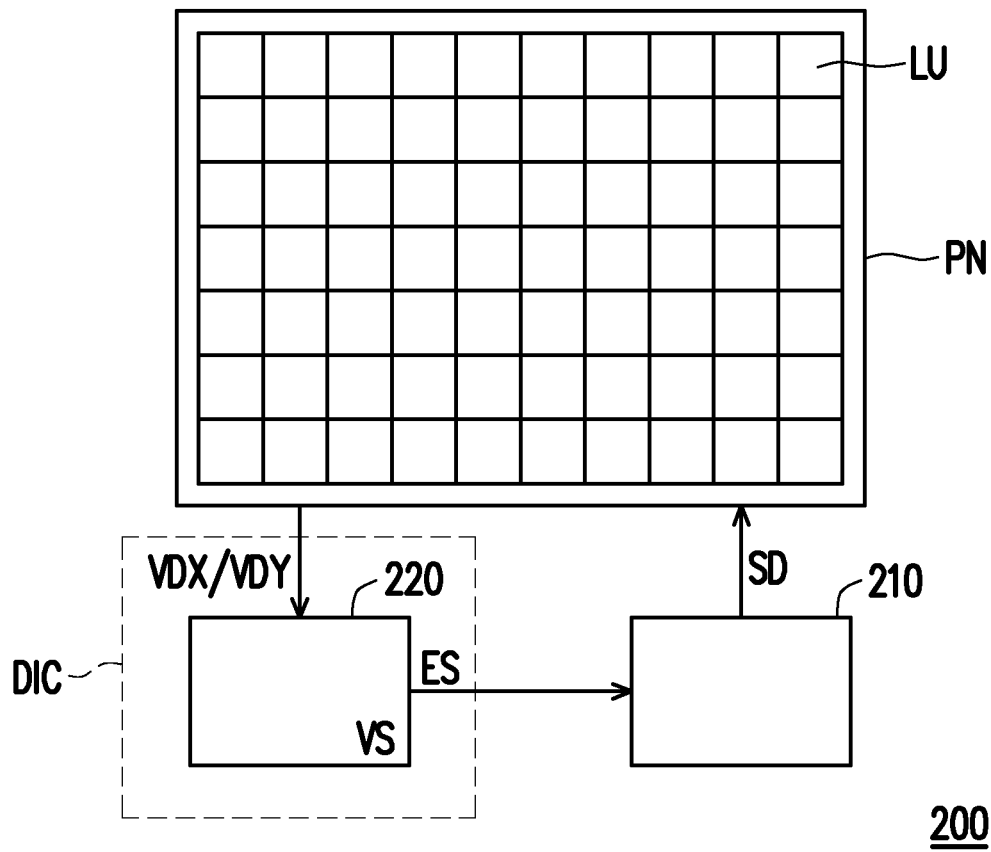
FIG. 2 is a schematic diagram of an electronic device according to a second embodiment of the disclosure.

With reference to FIG. 2, FIG. 2 is a schematic diagram of an electronic device according to a second embodiment of the disclosure. In this embodiment, an electronic device 200 includes a plurality of light-emitting units LU, a driving circuit 210, and a first comparator 220. The driving circuit 210 is electrically connected to the light-emitting units LU. The light-emitting units LU are disposed in the panel PN, for example but the disclosure is not limited thereto. In other embodiments, the light-emitting units LU are disposed in the backlight module 120, for example but the disclosure is not limited thereto. The first comparator 220 may be electrically connected to the driving circuit 210. The first comparator 220 receives one of a detected power consumption value and a detected current value from the light-emitting units LU, and is configured to compare the one of the detected power consumption value VDX and the detected current value VDY with the set value VS and obtain a relationship (a magnitude comparison result) therebetween to transmit a first signal ES. The driving circuit 210 may drive the light-emitting units LU according to the first signal ES.

For example, the first comparator 220 is configured to compare the detected power consumption value VDX with the set value VS (e.g., a set power consumption value) and obtain the relationship (e.g., the magnitude comparison result) therebetween to transmit the first signal ES. The set value VS is, for example, a set power consumption value that has been preset. For another example, the first comparator 220 is configured to compare the detected current value VDY with the set value VS (e.g., a set current value) and obtain the relationship (e.g., the magnitude comparison result) therebetween to transmit the first signal ES. The set value VS is a set current value that has been preset.

In this embodiment, the driving circuit 210 provides the driving signal SD to the light-emitting units LU according to the first signal ES, and accordingly drives the light-emitting units LU. The first signal ES differs based on different comparison results. In other words, the driving circuit 210 may provide the driving signal SD corresponding to the comparison result according to the first signal ES.

Figure 3:
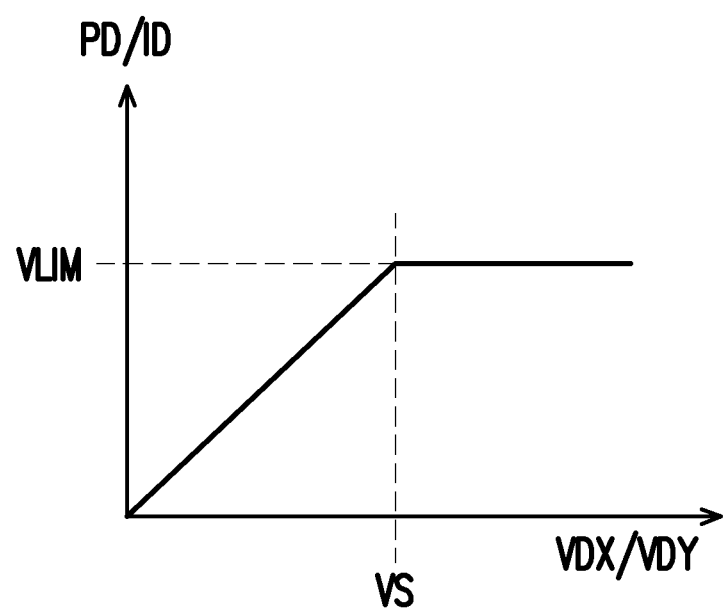
FIG. 3 is a schematic diagram of driving settings according to an embodiment of the disclosure.

With reference to FIG. 2 and FIG. 3 together, FIG. 3 is a schematic diagram of driving settings according to an embodiment of the disclosure. First, taking the detected power consumption value VDX as an example, the first comparator 220 may be configured to compare the detected power consumption value VDX with the set value VS. When the detected power consumption value VDX is less than or equal to the set value VS (i.e., the set power consumption value), the first comparator 220 provides, for example, the first signal ES having a first value (one of "1" or "0", for example but the disclosure is not limited thereto). At this time, the driving circuit 210 does not limit the power consumption value VDX provided to the light-emitting units LU, so the original electric potential energy provided to the light-emitting units LU may be maintained. In other words, the driving circuit 210 provides the electric energy (e.g., a total current value) of a total power PD positively correlated to the detected power consumption value VDX according to the first value of the first signal ES, for example but the disclosure is not limited thereto. Comparatively, when the detected power consumption value VDX is greater than the set value VS (i.e., the set power consumption value), the first comparator 220 provides the first signal ES having a second value (the other of "1" or "0", for example but the disclosure is not limited thereto). As a result, the driving circuit 210 provides, for example, the total power PD having a limit value VLIM according to the second value of the first signal ES. In other words, the driving circuit 210 limits the total power PD to the limit value VLIM, so that the total power of the electric energy provided to the light-emitting units LU may be maintained at the limit value VLIM as a maximum.

When the detected power consumption value VDX is greater than the set value VS (i.e., the set power consumption value), the light-emitting units LU may be at risk of reliability reduction under long-term operation. As a result, when the total power PD is limited to the limit value VLIM, for example, the risk of reliability reduction may be reduced.

In addition, taking the detected current value VDY as an example, the first comparator 220 compares the detected current value VDY with the set value VS (i.e., the set current value). When the detected current value VDY is less than or equal to the set value VS (i.e., the set current value), the first comparator 220 provides, for example, the first signal ES having a first value (one of "1" or "0", for example but the disclosure is not limited thereto). At this time, the driving circuit 210 does not limit the current value VDY provided to the light-emitting units LU, so the original electric potential energy provided to the light-emitting units LU may be maintained. In other words, the driving circuit 210 provides a total current value ID positively correlated to the detected current value VDY according to the first value of the first signal ES, for example but the disclosure is not limited thereto. Comparatively, when the detected current value VDY is greater than the set value VS (i.e., the set current value), the first comparator 220 provides the first signal ES having a second value (the other of "1" or "0", for example but the disclosure is not limited thereto). As a result, the driving circuit 210 provides, for example, the total current value ID having the limit value VLIM according to the second value of the first signal ES. In other words, the driving circuit 210 limits the total current value ID to the limit value VLIM, so that the total power of the electric energy provided to the light-emitting units LU may be maintained at the limit value VLIM as a maximum.

When the detected current value VDY is greater than the set value VS (i.e., the set current value), the light-emitting units LU may be at risk of reliability reduction under long-term operation. As a result, when the total current value ID is limited to the limit value VLIM, for example, the risk of reliability reduction may be reduced.

The first comparator 220 is configured to compare one of the detected power consumption value VDX and the detected current value VDY with the set value VS (i.e., one of the set power consumption value or the set current value) and obtain the relationship therebetween to transmit the first signal ES. The driving circuit 210 may adopt different driving conditions to drive the light-emitting units LU based on the comparison relationship. As such, the reliability of the light-emitting units LU may be maintained for a relatively long period.

In some embodiments, the first comparator 220 may be disposed in a detection integrated circuit DIC, for example but not limited thereto. In some embodiments, the driving circuit 210 and/or the detection integrated circuit DIC are disposed on the panel PN or on a circuit board outside the panel PN, for example but not limited thereto. In some embodiments, the driving circuit 210 and/or the detection integrated circuit DIC are disposed on a circuit board of the backlight module 120, for example.

Figure 4:
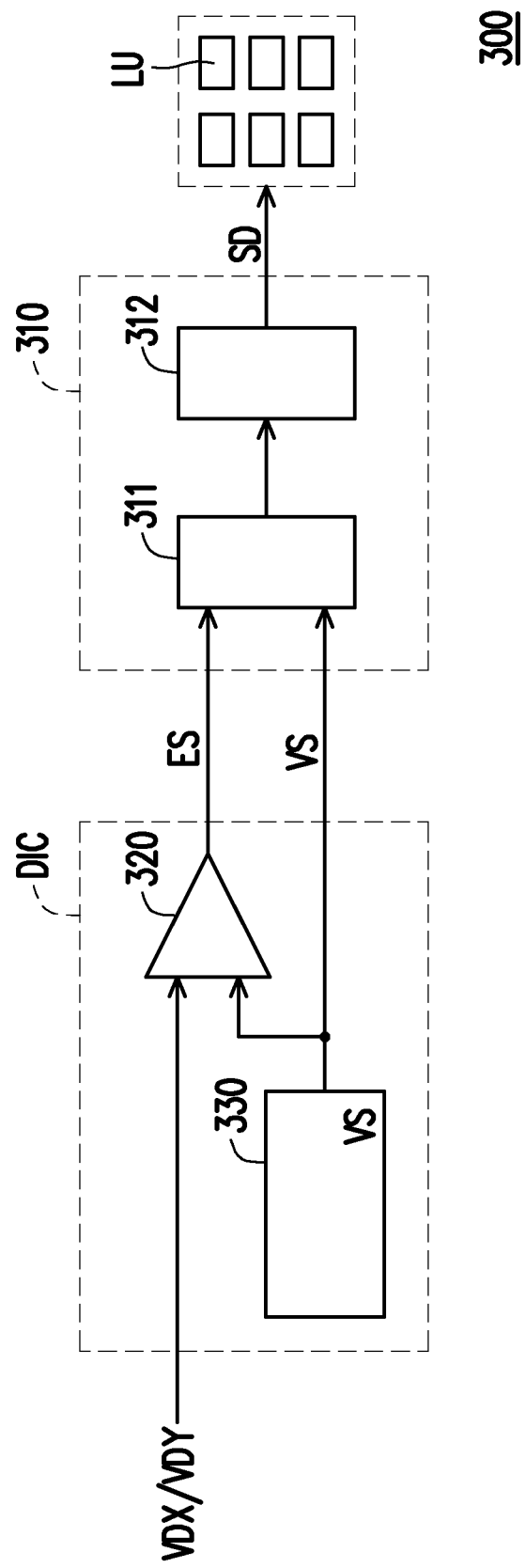
FIG. 4 is a schematic diagram of an electronic device according to a third embodiment of the disclosure.

With reference to FIG. 4, FIG. 4 is a schematic diagram of an electronic device according to a third embodiment of the disclosure. In this embodiment, an electronic device 300 includes a plurality of light-emitting units LU, a driving circuit 310, a first comparator 320, and a register 330. The register 330 may, for example, pre-store the set value VS (a set power consumption value or a set current value, for example but the disclosure is not limited thereto). The first input terminal of the first comparator 320 may receive a detected value. The detected value is one of the detected power consumption value VDX and the detected current value VDY. The second input terminal of the first comparator 320 is, for example, electrically connected to the register 330 to receive the set value VS. The first comparator 320 may be configured to compare the detected value with the set value VS and obtain the relationship therebetween to generate the first signal ES.

Taking the detected power consumption value VDX as an example, when the detected power consumption value VDX is less than or equal to the set value VS, the first comparator 320 may provide the first signal ES having a first value. Comparatively, when the detected power consumption value VDX is greater than the set value VS, the first comparator 320 provides the first signal ES having a second value.

The driving circuit 310 includes a processor 311 and/or a controller 312, but the disclosure is not limited thereto. The processor 311 may receive the set value VS and the first signal ES. When the first signal ES has the first value, the processor 311 does not limit the power consumption value VDX provided to the light-emitting units LU, so the processor 311 may control the controller 312 to maintain the original electric potential energy provided to the light-emitting units LU. When the first signal ES has the second value, the processor 311 may control the controller 312 so that the controller 312 limits the total power PD to the limit value VLIM, so the total power of the electric energy provided by the controller 312 to the light-emitting units LU is maintained at the limit value VLIM as a maximum.

Taking the detected current value VDY as an example, when the detected current value VDY is less than or equal to the set value VS, the first comparator 320 provides the first signal ES having a first value. Comparatively, when the detected current value VDY is greater than the set value VS, the first comparator 320 provides the first signal ES having a second value.

When the first signal ES has the first value, the processor 311 does not limit the current value VDY provided to the light-emitting units LU, so the processor 311 may control the controller 312 to maintain the original electric potential energy provided to the light-emitting units LU. When the first signal ES has the second value, the processor 311 may control the controller 312 so that the controller 312 limits the total current value ID to the limit value VLIM, so the current value of the electric energy provided by the controller 312 to the light-emitting units LU is maintained at the limit value VLIM as a maximum.

In some embodiments, the processor 311 includes, for example, a central processing unit (CPU), or any other programmable general-purpose or special-purpose microprocessor, digital signal processor (DSP), programmable controller, application specific integrated circuit (ASIC), programmable logic device (PLD), or other similar devices or a combination thereof, which may load and execute a computer program, but the disclosure is not limited thereto. The controller 312 may be a circuit that supplies a data voltage or a driving current. In some embodiments, at least one of the processor 311 and the controller 312 may be a control chip formed by COF (chip on FPC), COB (chip on board) or COG (chip on glass), but the disclosure is not limited thereto.

Figure 5:
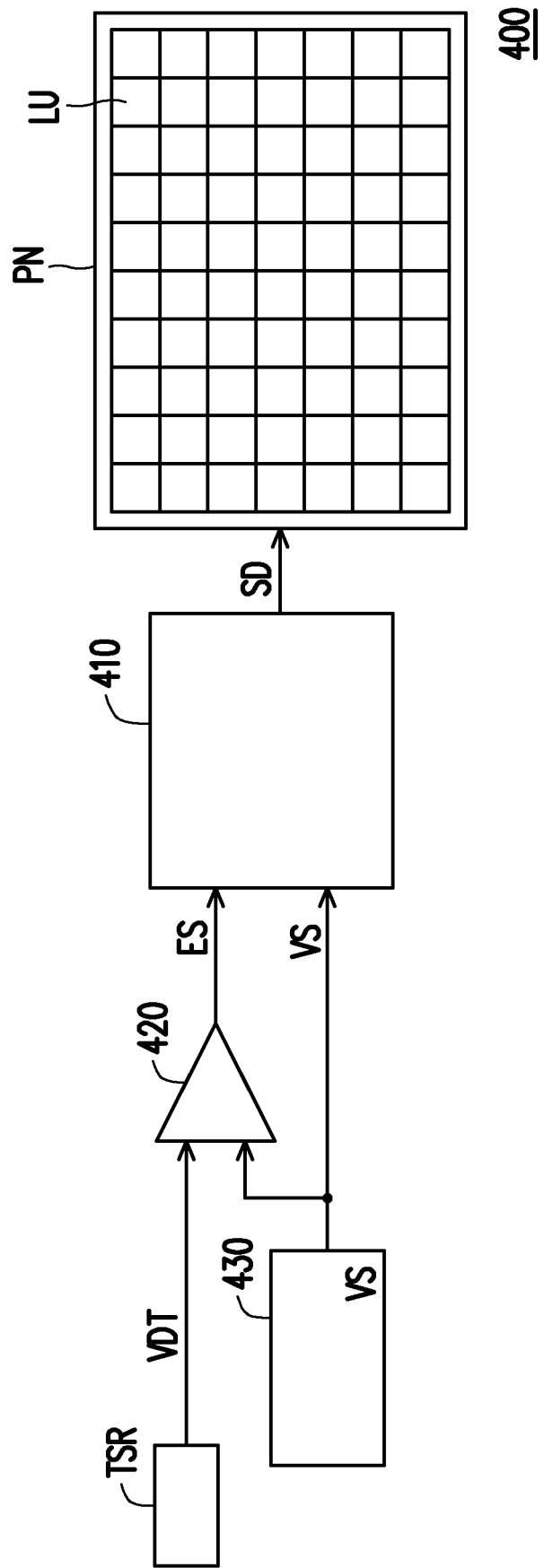
FIG. 5 is a schematic diagram of an electronic device according to a fourth embodiment of the disclosure.

With reference to FIG. 5, FIG. 5 is a schematic diagram of an electronic device according to a fourth embodiment of the disclosure. In this embodiment, an electronic device 400 includes a panel PN, a driving circuit 410, and at least one second comparator 420 (e.g., a temperature comparator). The panel PN includes a plurality of light-emitting units LU. The driving circuit 410 is electrically connected to the light-emitting units LU. The at least one second comparator 420 receives a detected temperature value VDT from the light-emitting units LU, and is configured to compare the detected temperature value VDT with a received set temperature value VS and obtain a relationship therebetween to transmit the first signal ES. The driving circuit 410 drives the light-emitting units LU according to the first signal ES. The detected temperature value VDT is obtained, for example, from a temperature sensor TSR detecting the light-emitting units LU. The temperature sensor TSR may, for example, detect the temperature (e.g., the detected temperature value VDT) generated by the light-emitting units LU of the electronic device 400, and provide the detected temperature value VDT to the second comparator 420 (e.g., a temperature comparator), but the disclosure is not limited thereto.

In this embodiment, the first input terminal of the second comparator 420 may receive the detected temperature value VDT. The second input terminal of the second comparator 420 may receive the set value VS (the set temperature value). The second comparator 420 compares a detected value (e.g., the detected temperature value VDT) with the set value VS (the set temperature value) and obtains the relationship therebetween to generate the first signal ES.

When the detected temperature value VDT is less than or equal to the set value VS, the second comparator 420 provides the first signal ES having a first value. At this time, the processor 311 in the driving circuit 410 may, for example, control the controller 312 to provide the original electric potential energy to the light-emitting units LU according to the first value of the first signal ES, so the original total power or total current value is maintained. Comparatively, when the detected temperature value VDT is greater than the set value VS, the second comparator 420 may provide the first signal ES having a second value. As a result, the processor 311 in the driving circuit 410 may control the controller 312 to limit the power or the total current value driven into the light-emitting units LU to a limit value (the limit value VLIM shown in FIG. 3) according to the second value of the first signal ES. When the detected temperature value VDT is greater than the set value VS, the light-emitting units LU may be at risk of reliability reduction under long-term operation. As a result, the total power or the total current value is limited as described above. The limit value may be, for example, a power value that maintains the reliability of the light-emitting units LU for a long time.

In this embodiment, the electronic device 400 further includes a register 430. The register 430 is electrically connected to the second input terminal of the second comparator 420. The register 430 may be configured to store the set value VS (e.g., a set temperature value).

Figure 6:
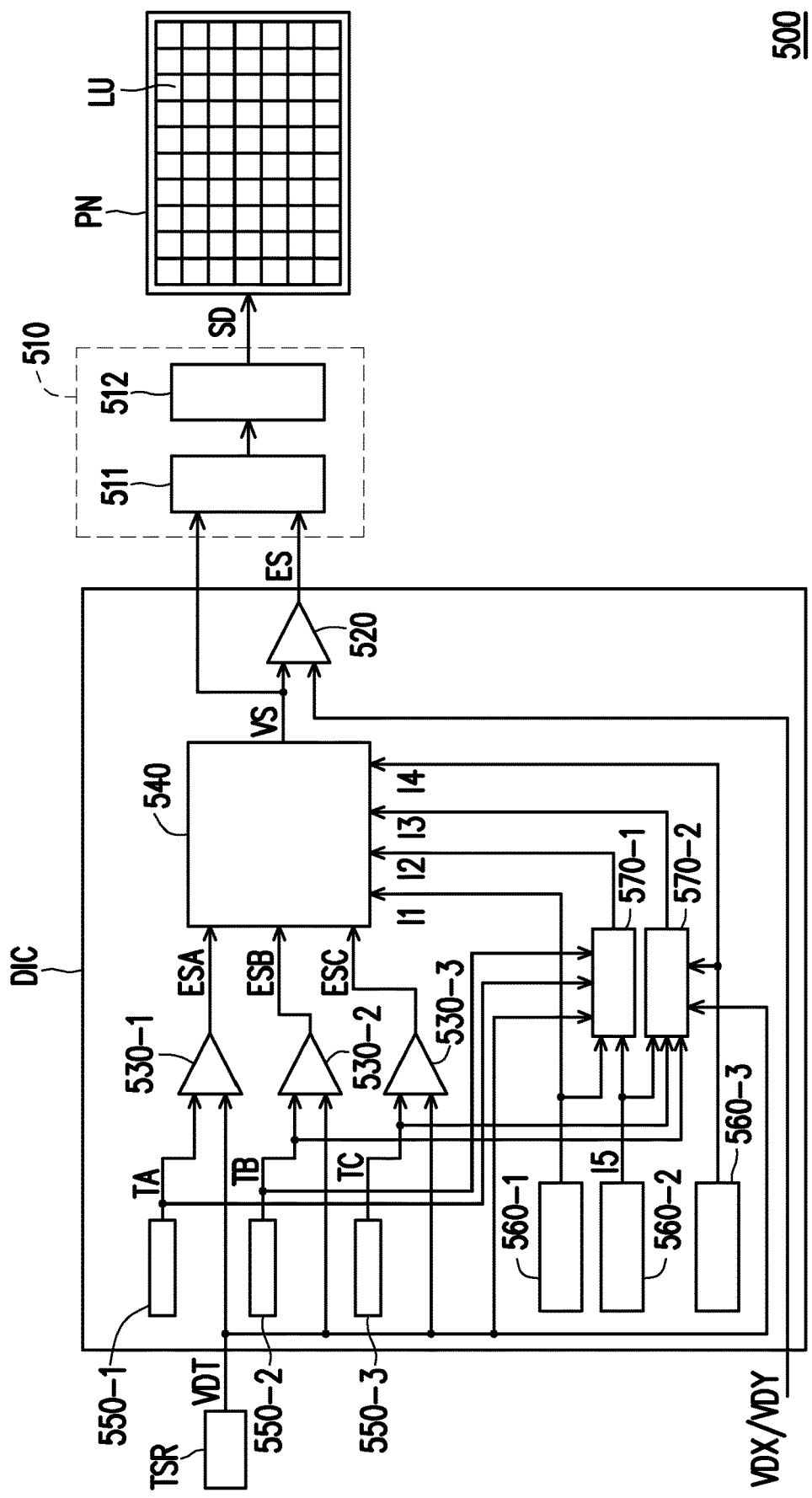
FIG. 6 is a schematic diagram of an electronic device according to a fifth embodiment of the disclosure.

With reference to FIG. 6, FIG. 6 is a schematic diagram of an electronic device according to a fifth embodiment of the disclosure. In this embodiment, an electronic device 500 includes a plurality of light-emitting units LU, a driving circuit 510, a first comparator 520 (e.g., a power consumption or current comparator), a plurality of second comparators 530-1 to 530-3 (e.g., temperature comparators), and/or a digital circuit 540. The digital circuit 540 may be electrically connected to the second comparators 530-1 to 530-3. The driving circuit 510 includes a processor 511 and/or a controller 512. The implementation details of the light-emitting units LU, the driving circuit 510, the first comparator 520, the processor 511, and the controller 512 have been clearly described in the embodiments of FIG. 2 and FIG. 4, and thus will not be repeatedly described here.

In this embodiment, the electronic device includes the plurality of second comparators 530-1 to 530-3 (e.g., temperature comparators) that may respective receive a plurality of set temperature values (e.g., a set temperature value TA, a set temperature value TB, and a set temperature value TC). The set temperature values may correspond to different set temperature values. The second comparators 530-1 to 530-3 (e.g., temperature comparators) may respectively compare the detected temperature value VDT with the set temperature values and obtain relationships therebetween to transmit a plurality of second signals (e.g., second signals ESA to ESC) to the digital circuit 540. The detected temperature value VDT is obtained, for example, from the temperature sensor TSR. The temperature sensor TSR may, for example, detect the temperature (e.g., the detected temperature value VDT) generated by the light-emitting units LU of the electronic device 500, and provide the detected temperature value VDT to the second comparators 530-1 to 530-3 (e.g., temperature comparators), but the disclosure is not limited thereto. Specifically, the second comparators 530-1 to 530-3 (e.g., temperature comparators) may each compare the detected temperature value VDT with the received corresponding set temperature value (e.g., one of the set temperature value TA, the set temperature value TB, and the set temperature value TC) and obtain the relationship therebetween to respectively transmit the second signals to the digital circuit 540. For example, the second comparator 530-1 may receive the set temperature value TA. The second comparator 530-1 may compare the detected temperature value VDT with the set temperature value TA and obtain the relationship therebetween to transmit the second signal ESA. The second comparator 530-2 may receive the set temperature value TB. The second comparator 530-2 may compare the detected temperature value VDT with the set temperature value TB and obtain the relationship therebetween to transmit the second signal ESB. The second comparator 530-3 may receive the set temperature value TC. The second comparator 530-3 may compare the detected temperature value VDT with the set temperature value TC and obtain the relationship therebetween to transmit the second signal ESC.

In some embodiments, the set temperature value TB is greater than the set temperature value TA, for example. The set temperature value TC is greater than the set temperature value TB, for example. When the detected temperature value VDT is greater than or equal to the set temperature value TA, the second comparator 530-1 provides, for example, the second signal ESA having a first value (e.g., "1"). When the detected temperature value VDT is less than the set temperature value TA, the second comparator 530-1 provides, for example, the second signal ESA having a second value (e.g., "0"). When the detected temperature value VDT is greater than or equal to the set temperature value TB, the second comparator 530-2 provides, for example, the second signal ESB having the first value. When the detected temperature value VDT is less than the set temperature value TB, the second comparator 530-2 provides, for example, the second signal ESB having the second value. When the detected temperature value VDT is greater than or equal to the set temperature value TC, the second comparator 530-3 provides, for example, the second signal ESC having the first value. When the detected temperature value VDT is less than the set temperature value TC, the second comparator 530-3 provides, for example, the second signal ESC having the second value.

The first comparator 520 is electrically connected between the digital circuit 540 and the driving circuit 510, for example. The digital circuit 540 is electrically connected to the second comparators 530-1 to 530-3, for example. The digital circuit 540 provides the set value VS to the first comparator 520 according to the second signals ESA, ESB, and ESC transmitted by the second comparators 530-1 to 530-3.

In some embodiments, the digital circuit 540 may receive the second signal ESA, the second signal ESB, and/or the second signal ESC, for example, and may also receive a plurality of candidate set values I1 to I4. The digital circuit 540 may select a set value from the candidate set values I1 to I4 as the set value VS according to the second signal ESA, the second signal ESB, and the second signal ESC. For example, the digital circuit 540 may select a selected set value according to the table below. The digital circuit 540 may be realized by a logic circuit or a multiplexer, but the disclosure is not limited thereto.

TABLE

| ESA | ESB | ESC | Selected set value |
|---|---|---|---|
| "0" | "0" | "0" | I1 |
| "1" | "0" | "0" | I2 |
| "1" | "1" | "0" | I3 |
| "1" | "1" | "1" | I4 |

In this embodiment, the electronic device 500 further includes temperature value registers 550-1 to 550-3. The temperature value registers 550-1 to 550-3 are respectively electrically connected to the second comparators 530-1 to 530-3. The temperature value registers 550-1 to 550-3 are each configured to store one of the set temperature values TA, TB, and TC. In this embodiment, the temperature value register 550-1 is electrically connected to the second comparator 530-1. The temperature value register 550-1 stores the set temperature value TA. The temperature value register 550-1 provides the set temperature value TA to the second comparator 530-1. The temperature value register 550-2 is electrically connected to the second comparator 530-2. The temperature value register 550-2 stores the set temperature value TB. The temperature value register 550-2 provides the set temperature value TB to the second comparator 530-2. The temperature value register 550-3 is electrically connected to the second comparator 530-3. The temperature value register 550-3 stores the set temperature value TC. The temperature value register 550-3 provides the set temperature value TC to the second comparator 530-3.

The electronic device 500 further includes a plurality of set value registers 560-1 to 560-3 and/or a computing circuit 570-1 and a computing circuit 570-2. The computing circuit 570-1 and/or the computing circuit 570-2 may be electrically connected to two of the set value registers 560-1 to 560-3. In this embodiment, the set value register 560-1 may store the candidate set value I1. The set value register 560-2 may store a candidate set value I5. The set value register 560-3 may store the candidate set value I4. The set value I1 is greater than the set value I5. The set value I5 is greater than set value I4. The candidate set value I1, the candidate set value I4, and the candidate set value I5 may each be constant, but the disclosure is not limited thereto. As a result, the candidate set values I1, I4, and I5 respectively stored in the set value registers 560-1 to 560-3 are each a constant candidate set value.

In this embodiment, the computing circuit 570-1 and the computing circuit 570-2 may generate the candidate set values I2 and I3 that are temperature-dependent according to the detected temperature value VDT, at least two of the set temperature value TA, the set temperature value TB, and the set temperature value TC, and/or at least two of the candidate set values I1, I4, I5. For the detailed formulae related to the candidate set values I2 and I3, reference may be made to Formula (1) and Formula (2) below, but not limited thereto.

The computing circuit 570-1 is electrically connected to the temperature value register 550-1, the temperature value register 550-2, the set value register 560-1, and the set value register 560-2. The computing circuit 570-1 may generate the temperature-dependent candidate set value I2 according to the detected temperature value VDT, the set temperature value TA and the set temperature value TB, and/or the candidate set value I1 and the candidate set value I5, but the disclosure is not limited thereto. The computing circuit 570-1 performs operation on the detected temperature value VDT, the set temperature value TA, the set temperature value TB, the candidate set value I1, and the candidate set value I5 according to Formula (1) to generate the candidate set value I2, for example but the disclosure is not limited thereto.

$$I2 = \frac{(I5 - I1)}{(TB - TA)} \times (VDT - TA) + I1 \qquad \text{Formula (1)}$$

The computing circuit 570-2 may be electrically connected to the temperature value register 550-2, the temperature value register 550-3, the set value register 560-2, and the set value register 560-3. The computing circuit 570-2 may generate the temperature-dependent candidate set value I3 according to the detected temperature value VDT, the set temperature value TB, the set temperature value TC, the candidate set value I4, and/or the candidate set value I5, but the disclosure is not limited thereto. The computing circuit 570-2 performs operation on the detected temperature value VDT, the set temperature value TB, the set temperature value TC, the candidate set value I4, and/or the candidate set value I5 according to Formula (2) to generate the candidate set value I3, but the disclosure is not limited thereto.

$$I3 = \frac{(I5 - I4)}{(TC - TB)} \times (VDT - TB) + I5 \qquad \text{Formula (2)}$$

Based on Formula (1) and Formula (2), the candidate set values I2 and I3 decrease as the detected temperature value VDT increases.

In this embodiment, the digital circuit 540 may select a selected set value from the candidate set value I2 and the candidate set value I3 that are temperature-dependent or the candidate set value I1 and the candidate set value I4 that are constant to serve as the set value VS according to the second signal ESA, the second signal ESB, and/or the second signal ESC.

In this example, the first comparator 520, the second comparators 530-1 to 530-3, the digital circuit 540, the temperature value registers 550-1 to 550-3, the set value registers 560-1 to 560-3, and the computing circuits 570-1 and 570-2 may be disposed in the detection integrated circuit DIC, for example but not limited thereto.

Figure 7:
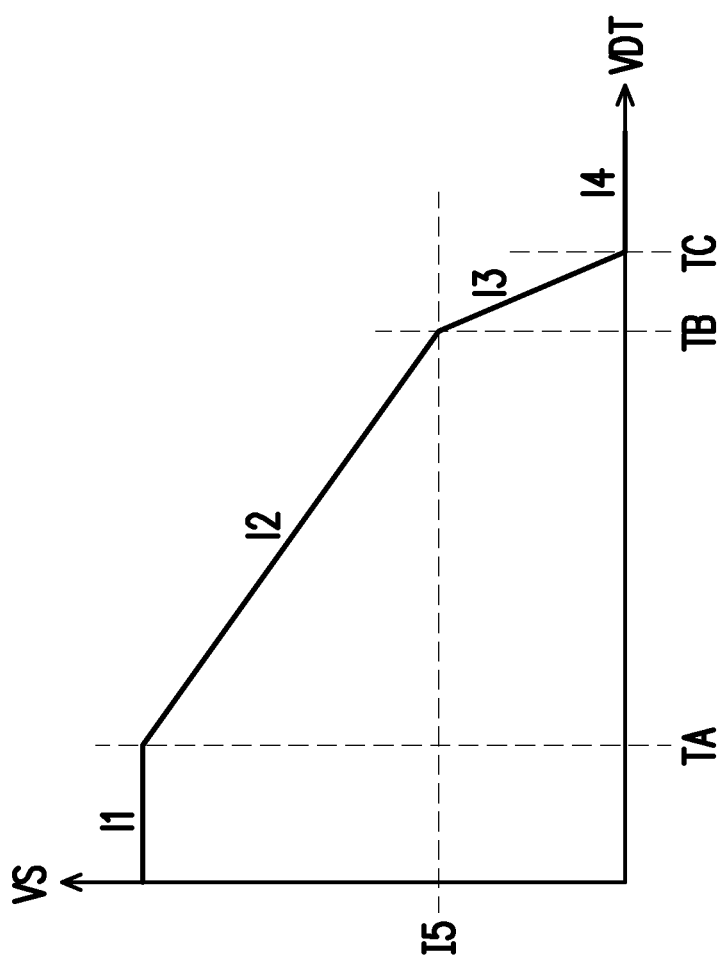
FIG. 7 is a schematic diagram of driving settings according to an embodiment of the disclosure.

With reference to FIG. 6 and FIG. 7 together, FIG. 7 is a schematic diagram of driving settings according to an embodiment of the disclosure. In this embodiment, when the detected temperature value VDT is less than the set temperature value TA, the digital circuit 540 may select the candidate set value I1 as the set value VS. When the detected temperature value VDT is greater than or equal to the set temperature value TA and less than the set temperature value TB, the digital circuit 540 may select the candidate set value I2 as the set value VS. The candidate set value I2 may be temperature-dependent as shown in Formula (1) above. As a result, the set value VS decreases as the detected temperature value VDT increases. When the detected temperature value VDT is greater than or equal to the set temperature value TB and less than the set temperature value TC, the digital circuit 540 may select the candidate set value I3 as the set value VS. The candidate set value I3 may also be temperature-dependent as shown in Formula (2) above. As a result, the set value VS decreases as the detected temperature value VDT increases. When the detected temperature value VDT is greater than or equal to the set temperature value TC, the digital circuit 540 may select the candidate set value I4 as the set value VS.

Figure 8:
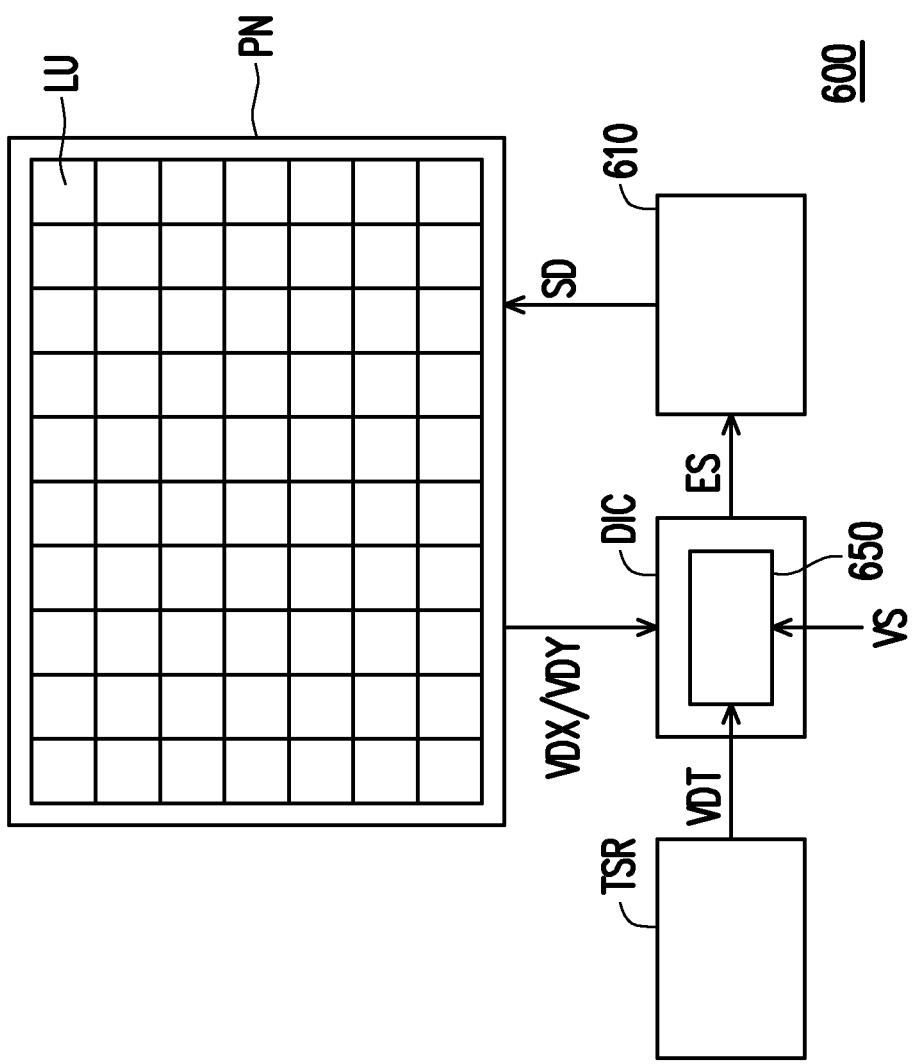
FIG. 8 is a schematic diagram of an electronic device according to a sixth embodiment of the disclosure.

With reference to FIG. 8, FIG. 8 is a schematic diagram of an electronic device according to a sixth embodiment of the disclosure. In this embodiment, an electronic device 600 includes a plurality of light-emitting units LU, a driving circuit 610, a detection integrated circuit DIC, and/or a temperature sensor TSR. The temperature sensor TSR may be disposed on or in the housing of the electronic device 600, for example. The detected temperature value VDT is obtained, for example, from the temperature sensor TSR. The temperature sensor TSR may, for example, detect the temperature (e.g., the detected temperature value VDT) generated by the light-emitting units LU of the electronic device 600, and provide the detected temperature value VDT to the detection integrated circuit DIC (e.g., a comparator 650). One end of the comparator 650 in the detection integrated circuit DIC may receive the set value VS, and another end may receive the detected temperature value VDT. The comparator 650 may transmit the first signal ES according to the relationship between the detected temperature value VDT and the set value VS. The driving circuit 610 may drive the light-emitting units LU according to the first signal ES. In addition, the detection integrated circuit DIC may further detect a power consumption value (e.g., the detected power consumption value VDX) or a current value (e.g., the detected current value VDY) of the electronic device 600 to obtain the relationship between the detected power consumption value VDX and the detected temperature value VDT or between the detected current value VDY and the detected temperature value VDT, but the disclosure is not limited thereto.

Figure 9:
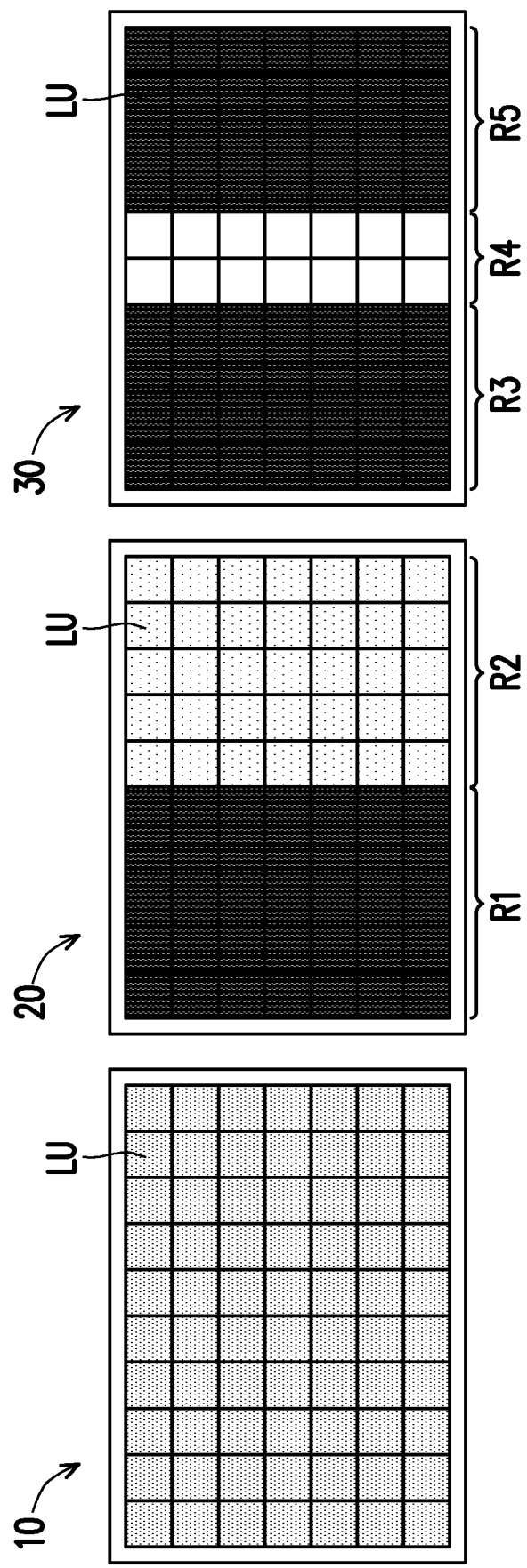
FIG. 9 is a schematic diagram of operations of an electronic device according to an embodiment of the disclosure.

With reference to FIG. 2, FIG. 3, and FIG. 9 together, FIG. 9 is a schematic diagram of operations of an electronic device according to an embodiment of the disclosure. FIG. 9 shows different operation results 10, 20, and 30 corresponding to different numbers of driven light-emitting units LU. In this embodiment, the driving circuit 210 may provide the total power PD having the limit value VLIM according to a second value of the first signal ES. For example, the limit value VLIM may be equal to 10 watts (W), but the disclosure is not limited thereto. The power consumption of circuit components in the panel PN other than the light-emitting units LU may be equal to 2 W. As a result, the power allocated to the light-emitting units LU is equal to 8 W.

Regarding the operation result 10, a total of 70 light-emitting units LU are driven. As a result, the power consumption of each light-emitting unit LU may be limited to about 0.11 W (e.g., 8 W divided by 70 is about 0.11 W), but the disclosure is not limited thereto. Regarding the operation result 20, the light-emitting units LU in a region R1 of the panel PN may be not driven, for example, while 35 light-emitting units LU in a region R2 of the panel PN may be driven, for example. As a result, the power consumption of each light-emitting unit LU in the region R2 may be limited to about 0.23 W (e.g., 8 W divided by 35 is about 0.23 W), but the disclosure is not limited thereto. Regarding the operation result 30, the light-emitting unit LU in a region R3 and a region R5 of the panel PN may be not driven, for example, while 14 light-emitting units LU in a region R4 of the panel PN may be driven, for example. As a result, the power consumption of each light-emitting unit LU in the region R4 may be limited to about 0.57 W (e.g., 8 W divided by 14 is about 0.57 W). When the total power PD is limited, the power consumption of each driven light-emitting unit LU increases as the number of driven light-emitting units LU decreases. In other words, the brightness of each driven light-emitting unit LU increases as the number of driven light-emitting units LU decreases. It should be noted that the above takes the driven light-emitting units LU being driven at the same power consumption as an example, but the disclosure is not limited thereto. In other embodiments, the driven light-emitting units LU are not limited to being driven at the same power consumption.

In summary of the foregoing, according to the embodiments of the disclosure, the driving circuit may drive the light-emitting units based on the detected power consumption value, the detected current value, and the detected temperature value. As such, in the electronic device according to the embodiments of the disclosure, the reliability of the light-emitting units can be maintained under operating conditions of a high power consumption and/or a high temperature.

It will be apparent to those skilled in the art that various modifications and variations may be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. An electronic device comprising:
a plurality of light-emitting units;
a driving circuit electrically connected to the light-emitting units;
a first comparator electrically connected to the driving circuit, wherein the first comparator receives one of a detected power consumption value and a detected current value from the light-emitting units, and compares the one of the detected power consumption value and the detected current value with a set value and obtains a relationship therebetween to transmit a first signal;
a plurality of second comparators; and
a digital circuit electrically connected to the second comparators,
wherein the second comparators respectively receive a plurality of set temperature values, and respectively compare a detected temperature value with the set temperature values and obtains relationships therebetween to transmit a plurality of second signals to the digital circuit,
wherein the driving circuit drives the light-emitting units according to the first signal.

2. The electronic device according to claim 1, wherein the first comparator compares the detected power consumption value with the set value and obtains the relationship therebetween to transmit the first signal, and the set value is a set power consumption value.

3. The electronic device according to claim 1, wherein the first comparator compares the detected current value with the set value and obtains the relationship therebetween to transmit the first signal, and the set value is a set current value.

4. The electronic device according to claim 1, wherein the first comparator is electrically connected between the digital circuit and the driving circuit.

5. The electronic device according to claim 4, wherein the digital circuit provides the set value to the first comparator according to the second signals transmitted by the second comparators.

6. The electronic device according to claim 1, further comprising:
a plurality of temperature value registers respectively electrically connected to the second comparators, wherein each of the temperature value registers is configured to store one of the set temperature values.

7. The electronic device according to claim 6, further comprising:
a plurality of set value registers, wherein each of the set value registers is configured to store one of a plurality of constant candidate set values.

8. The electronic device according to claim 7, further comprising:
a computing circuit electrically connected to two of the set value registers.

9. The electronic device according to claim 8, wherein the computing circuit generates a temperature-dependent candidate set value according to the detected temperature value, at least two of the set temperature values, and at least two of the constant candidate set values.

10. The electronic device according to claim 9, wherein the digital circuit selects the set value from the temperature-dependent candidate set value and the constant candidate set values according to the second signals.

11. An electronic device comprising:
a panel comprising a plurality of light-emitting units;
a driving circuit electrically connected to the light-emitting units;
at least one temperature comparator, wherein the at least one temperature comparator receives a detected temperature value from the light-emitting units and is configured to compare the detected temperature value with at least one received set temperature value and obtain a relationship therebetween to transmit a first signal; and
at least one temperature value register correspondingly electrically connected to the at least one temperature comparator and being configured to store the at least one set temperature value,
wherein the driving circuit drives the light-emitting units according to the first signal.

12. The electronic device according to claim 11, further comprising:
a digital circuit electrically connected to the at least one temperature comparator,
wherein the at least one temperature comparator respectively compares the detected temperature value with one of the at least one set temperature value and obtains the relationship therebetween to transmit the first signal to the digital circuit.

13. The electronic device according to claim 12, further comprising:
a first comparator electrically connected between the digital circuit and the driving circuit.

14. The electronic device according to claim 13, wherein the digital circuit provides a set value to the first comparator according to the first signal transmitted by the at least one temperature comparator.

15. The electronic device according to claim 13, wherein the first comparator compares a detected power consumption value with a set value and obtains the relationship therebetween to transmit a second signal, and the set value is a set power consumption value.

16. The electronic device according to claim 13, wherein the first comparator compares a detected current value with a set value and obtains the relationship therebetween to transmit a second signal, and the set value is a set current value.

17. The electronic device according to claim 12, further comprising:
a plurality of set value registers, wherein each of the set value registers is configured to store one of a plurality of constant candidate set values.

18. The electronic device according to claim 17, wherein the at least one set temperature value comprises a plurality of set temperature values, and the electronic device further comprises:
a computing circuit electrically connected to two of the set value registers and being configured to generate a temperature-dependent candidate set value according to the detected temperature value, at least two of the set temperature values, and at least two of the constant candidate set values.

* * * * *